(12) United States Patent
Park et al.

(10) Patent No.: US 8,159,908 B2
(45) Date of Patent: Apr. 17, 2012

(54) PHOTO DIODE IC

(75) Inventors: Soo-han Park, Yongin-si (KR); Jong-uk Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1161 days.

(21) Appl. No.: 10/565,195

(22) PCT Filed: Oct. 17, 2003

(86) PCT No.: PCT/KR03/02169

§ 371 (c)(1),
(2), (4) Date: Jan. 20, 2006

(87) PCT Pub. No.: WO2005/029481

PCT Pub. Date: Mar. 31, 2005

(65) Prior Publication Data

US 2006/0209647 A1    Sep. 21, 2006

(30) Foreign Application Priority Data

Sep. 20, 2003   (KR) .................. 10-2003-0065382

(51) Int. Cl.
*G11B 7/095* (2006.01)
(52) U.S. Cl. ............... 369/44.37; 369/44.41; 369/44.23; 369/44.42; 369/44.29; 250/201.5; 250/201.4
(58) Field of Classification Search ............... 250/201.5, 250/201.4, 237 G; 369/44.37, 44.41, 44.23, 369/44.42, 44.29
See application file for complete search history.

(56) References Cited

U.S. PATENT DOCUMENTS

| | | | |
|---|---|---|---|
| 4,467,462 A | | 8/1984 | Shibata |
| 4,767,921 A | * | 8/1988 | Kawasaki et al. .......... 250/201.5 |
| 4,858,216 A | | 8/1989 | Kamiya |
| 5,400,093 A | * | 3/1995 | Timmers ...................... 353/101 |

(Continued)

FOREIGN PATENT DOCUMENTS

CN    1316735 A    10/2001

(Continued)

OTHER PUBLICATIONS

Office Action issued in Chinese Patent Application No. 200380110293.9 on Jul. 6, 2007.

(Continued)

*Primary Examiner* — Wayne Young
*Assistant Examiner* — Dionne Pendleton
(74) *Attorney, Agent, or Firm* — Stanzione & Kim, LLP (57) ABSTRACT

A photodetector detecting reflected light components from an optical medium, the photodetector including a first detector divided into eight sections detecting the reflected light components and converting the light components into electrical signals, a first calculating portion calculating a first tracking error signal from the electrical signals by a differential push-pull method, a second calculating portion calculating a first focusing error signal by an astigmatism method and calculating a second tracking error signal by a differential phase detection method from the electrical signals converted by the first detector; a second detector divided into four sections detecting the reflected light components reflected by the optical recording medium to convert the light components into electrical signals; and a third calculating portion calculating a second focusing error signal by the astigmatism method and calculating a third tracking error signal by the differential phase detection method from the electrical signals converted by the second detector.

16 Claims, 5 Drawing Sheets

U.S. PATENT DOCUMENTS

| | | | |
|---|---|---|---|
| 5,914,925 A | 6/1999 | Lee et al. | |
| 6,064,637 A | 5/2000 | Ju et al. | |
| 6,246,660 B1 | 6/2001 | Yanagawa | |
| 6,285,635 B1 | 9/2001 | Watanabe et al. | |
| 6,292,453 B1 | 9/2001 | Ichimura et al. | |
| 6,424,606 B1 | 7/2002 | Okazaki et al. | |
| 6,493,296 B1 | 12/2002 | Fukumoto et al. | |
| 6,507,009 B1 | 1/2003 | Ohnishi et al. | |
| 6,552,974 B1* | 4/2003 | Kim | 369/44.37 |
| 6,621,776 B2 | 9/2003 | Kawashima | |
| RE38,538 E * | 6/2004 | Yamakawa et al. | 369/44.29 |
| 6,778,475 B2* | 8/2004 | Izumi et al. | 369/44.41 |
| 6,940,805 B2* | 9/2005 | Finkelstein et al. | 369/124.01 |
| 7,116,612 B2* | 10/2006 | Ogasawara et al. | 369/44.37 |
| 7,911,922 B2* | 3/2011 | Masui | 369/112.04 |
| 2002/0047084 A1* | 4/2002 | Hayashi et al. | 250/201.5 |
| 2003/0072228 A1 | 4/2003 | Izumi et al. | |
| 2003/0206503 A1* | 11/2003 | Kosoburd et al. | 369/44.29 |
| 2004/0246834 A1* | 12/2004 | Seong | 369/44.37 |

FOREIGN PATENT DOCUMENTS

| | | |
|---|---|---|
| EP | 1 047 052 | 10/2000 |
| EP | 1 286 343 | 2/2003 |
| JP | 2001-222825 | 8/2001 |
| JP | 2001-236652 | 8/2001 |
| JP | 2002-216372 | 8/2002 |
| JP | 2002-245660 | 8/2002 |
| JP | 2003-99951 | 4/2003 |
| WO | WO 02/49023 | 6/2002 |

OTHER PUBLICATIONS

Office Action dated Jul. 1, 2008, issued from the Japanese Patent Office with respect to Japanese Patent Application No. 2005-509069.
Supplementary European Search Report dated Aug. 5, 2008, used from European Patent Office with respect to European Patent Application No. 03751580.6.

* cited by examiner

PHOTO DIODE IC

CROSS-REFERENCE TO RELATED APPLICATIONS

This application claims the benefit of PCT International Patent Application No. PCT/KR2003/002169, filed Oct. 17, 2003, and Korean Patent Application No. 2003-65382, filed Sep. 20, 2003, in the Korean Intellectual Property Office, the disclosures of which are incorporated herein by reference.

BACKGROUND OF THE INVENTION

1. Field of the Invention

An aspect of the present invention relates to a photodetector, and more particularly, to a photodetector of an optical pick-up for detecting a reflected light component from an optical disk. The optical pick-up includes a two-wavelength laser diode (LD) radiating a laser beam varying in accordance with the type of optical disk, and the photodetector which converts the detected laser beam into an electrical signal.

An aspect of the present invention relates to a twelve-division photodetector of an optical pick-up for detecting the laser beam radiated by the two-wavelength laser diode that varies with the type of an optical disk and converts the laser beam into an electrical signal.

2. Description of the Related Art

An optical recording and reproducing apparatus records data in an optical disk and reproduces the recorded data into a signal that can be recognized by a user. An optical pick-up is required for recording and reproducing data. When data is recorded, the optical pick-up radiates a laser beam on the surface of an optical disk to form a pit. Also, when the recorded data is reproduced, the optical pick-up optically reads information on the pit formed on the optical disk to output an electrical signal. In order to perform such an operation, the optical pick-up is composed of a plurality of optical elements such as a laser diode (LD) for radiating a laser beam, a diffraction grating, a beam splitter for controlling the deflection of a laser beam, a plurality of lenses for forming an optical path, and a sensor for detecting a signal.

On the other hand, the optical disk used for recording and reproducing data can be of various types. Examples of such disks include, compact disks (CD's) and digital video disks (DVD's). Therefore, recently, an optical recording and reproducing apparatus having a function of recording data in and/or reproducing data from a CD and a DVD is commonly used. In order to record data in and/or reproduce data from such an optical recording and reproducing device, a laser beam having a wavelength that varies with either the CD or the DVD, is radiated. In order to perform such an operation, a conventional optical recording and reproducing apparatus separately includes a CD LD and a DVD LD and, accordingly, a CD optical portion and a DVD optical portion.

The above-described conventional optical pick-up includes two LDs having a complicated structure in an optical system. That is, the number of optical elements that constitute the optical pick-up increases such that the structure of an optical system is complicated. In particular, according to the conventional optical pick-up, when optical elements such as a beam splitter and a photo diode, having an optical path common to the two LDs, are assembled in order to conform the optical axes of the laser beams radiated by two LDs to coincide with each other, a complicated assembling process must be performed. Therefore, according to the conventional optical pick-up, due to the complicated assembling process, productivity is reduced, process yield deteriorates, and the number of optical elements increases thus increasing manufacturing cost.

SUMMARY OF THE INVENTION

It is an aspect of the present invention to provide a photodetector in an optical pick-up capable of detecting the laser beam radiated by a two-wavelength laser diode (LD) that can be appropriately used to simplify and to miniaturize the optical pick-up and to reduce the manufacturing cost of the optical pick-up.

To achieve an aspect of the present invention, it is possible to easily detect light components emitted from the two-wavelength laser diode using a twelve-division photodetector.

Here, the two-wavelength LD radiates a DVD laser beam and a CD laser beam. The photodetector generates a tracking error (TE) signal and a focusing error (FE) signal from the laser beam reflected by a DVD or a CD. In order to perform such an operation, the photodetector is divided into an eight-division photodetector in order to detect the laser beam reflected by the DVD and a four-division photodetector in order to detect the laser beam reflected by the CD.

When either a DVD-R or a DVD±RW is mounted in an optical recording and reproducing apparatus, the photodetector generates a DVD FE signal by an astigmatism method and a TE signal by a differential push-pull (DPP) method. When a DVD-ROM is mounted in the optical recording and reproducing apparatus, the photodetector generates the DVD FE signal by the astigmatism method and the TE signal by a differential phase detection (DPD) method. When a CD is mounted in the optical recording and reproducing apparatus, the photodetector generates a CD FE signal by the astigmatism method and the TE signal by the DPD method. Therefore, when the two-wavelength LD's are included, it is possible to simplify the structure of the optical system of the optical pick-up.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
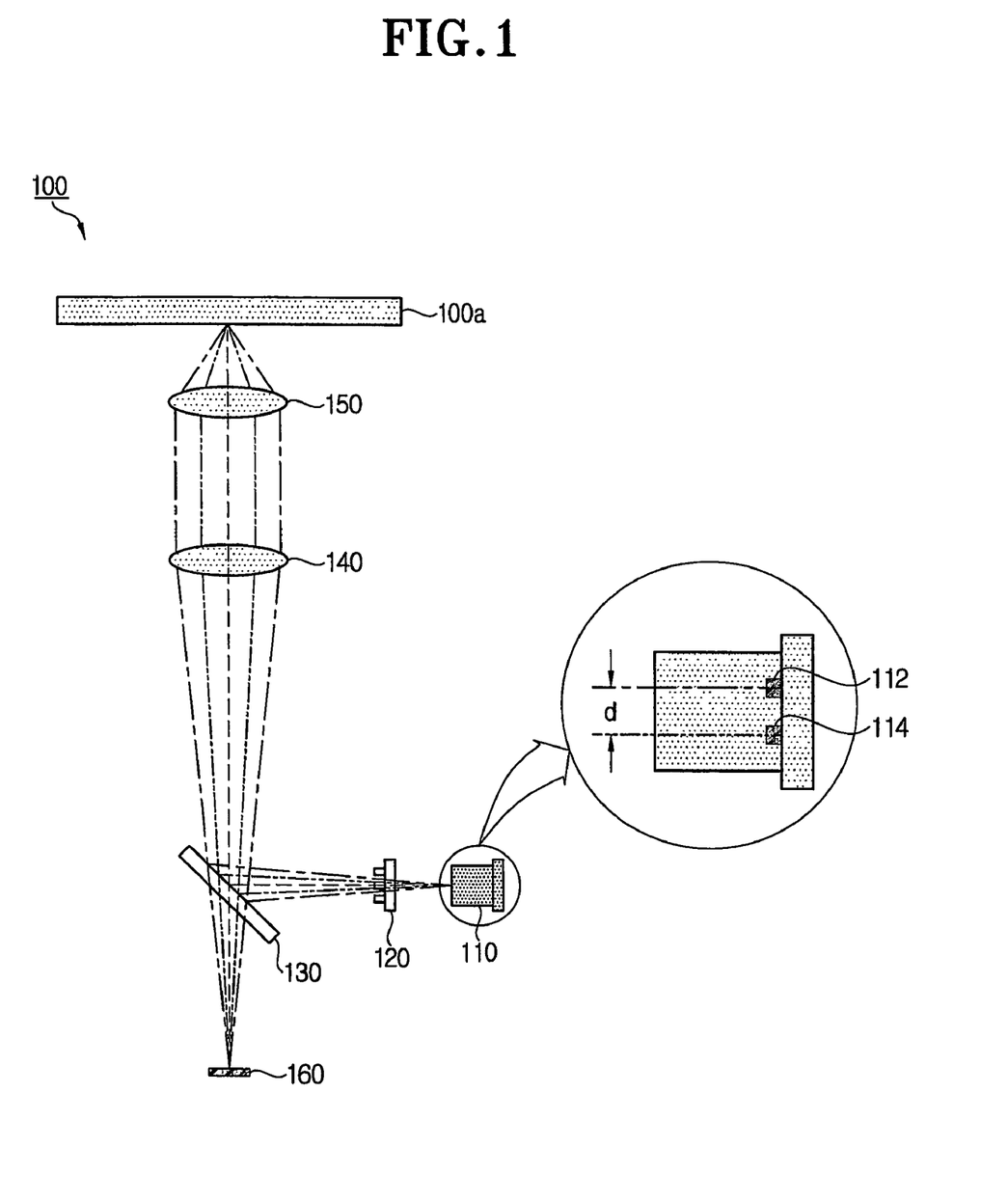
FIG. 1 schematically illustrates an optical pick-up according to an embodiment of the present invention.

FIG. 1 schematically illustrates an optical pick-up according to an embodiment of the present invention.

Referring to FIG. 1, an optical pick-up 100 according to an aspect of the present invention includes a two-wavelength laser diode (LD) 110, a diffraction grating 120, a beam splitter 130, a condensing lens 140, an object lens 150, and a photodetector 160.

The optical pick-up 100 according to an aspect of the present invention is included in an optical recording and reproducing apparatus (not shown) and optically reads data recorded in an optical disk 100a and converts the data into an electrical signal to output the electrical signal. Here, the optical recording and reproducing apparatus such as a compact disk player (CDP), a digital video disk player (DVDP), and a digital video disk recorder (DVDR), records data in and/or reproduces data from the optical disk 100a. The optical disk 100a that is an optical recording medium in which data is recorded includes a DVD such as a DVD-R, a DVD-RW, a DVD+RW, a DVD-RAM, and a DVD-ROM and a CD such as a CD-R, a CD-RW, and a CD-ROM but is not limited to the above. Here, R means that data can be recorded once and ±RW and RAM mean that data can be recorded a plurality of times.

The DVD light source 112 and a CD light source 114 that radiate light components having different wavelengths, forming part of the two wavelength LD 110, are included in a case (such as a can). In FIG. 1, a one-dot chain line, a two-dot chain line, and a dotted line denote a path of the light radiated by the DVD light source 112, a path of the light radiated by the CD light source 114, and a path of the central light of the respective light components, respectively.

When a DVD is mounted in an optical recording and reproducing apparatus (not shown), the DVD light source 112 emits visible rays having a wavelength of about 650 nm. When a CD is mounted in the optical recording and reproducing apparatus, the CD light source 114 emits infrared rays having a wavelength of about 780 nm. The DVD light source 112 and the CD light source 114 are used for recording a predetermined signal in the optical disk 100a or for reading the recorded signal from the optical disk 100a and are separated from each other by a predetermined distance d.

The diffraction grating 120 divides the laser beam having a predetermined wavelength radiated by the two-wavelength LD 110 into at least three beams. That is, the laser beam of a predetermined wavelength that passes through the diffraction grating 120 is divided into a 0 order beam that travels straight by a diffraction groove formed on the grating and a ±1 order beam that travels at a predetermined diffraction angle. A divided laser beam is used in order to minimize the CD offset of a TE signal generated during the movement of the object lens 150 as described later. Here, the 0 order beam is the central light among the diffracted light components, the +1 order beam is a first peripheral light component, and the −1 order beam is a second peripheral light component.

The beam splitter 130 makes the three beams divided by the diffraction grating 120 radiate onto the optical disk 100a and makes the laser beam reflected by the optical disk 100a incident on the photodetector 160 as described later.

The condensing lens 140, which is a kind of collimating lens, converts the laser beam having a predetermined diffraction angle caused by the beam splitter 130 into parallel light.

The object lens 150 focuses the laser beam output by the condensing lens 140 onto the optical disk 100a. The object lens 150 performs a focusing servo and a tracking servo by an actuator (not shown).

The laser beam reflected from the surface of the optical disk 100a is incident on a predetermined position of the photodetector 160 through the object lens 150, the condensing lens 140, and the beam splitter 130. The photodetector 160 is a type of photodiode integrated circuit (IC) for detecting the light reflected by the optical disk 100a and for converting the light into an electrical signal. Description thereof is omitted since it is a well-known technology.

Figure 2:
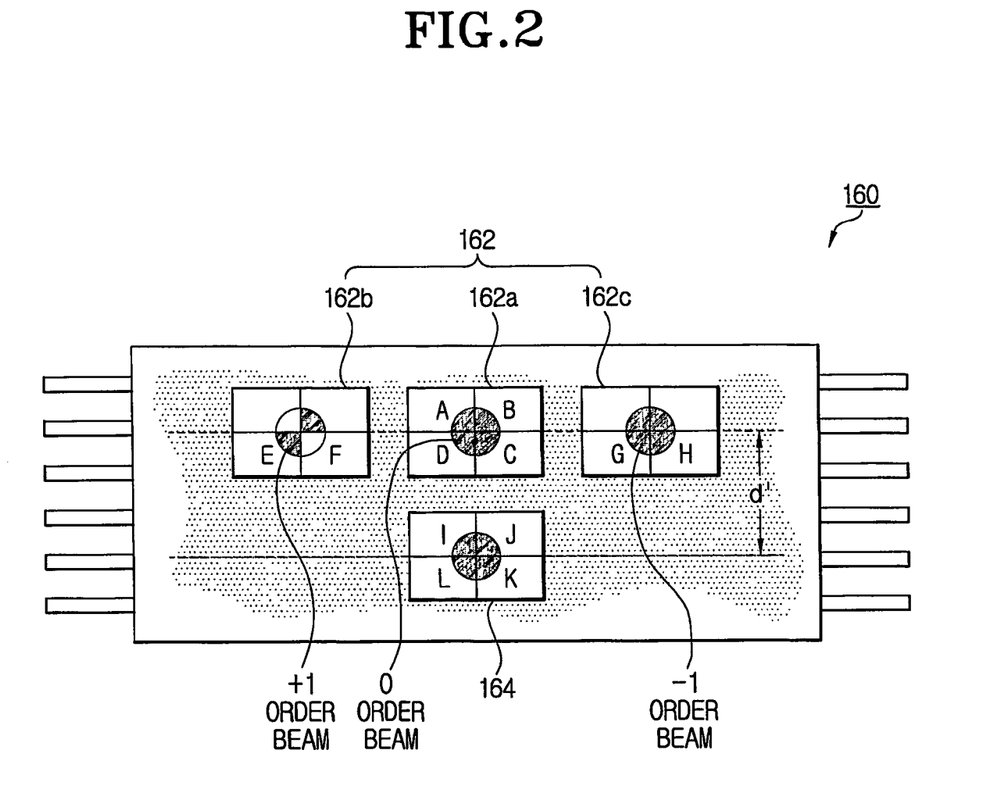
FIG. 2 schematically illustrates an arrangement relationship among the sensors that constitute the photodetector illustrated in FIG. 1.

FIG. 2 illustrates the photodetector 160 according to an aspect of the present invention.

Referring to FIG. 2, the photodetector 160 according to an aspect of the present invention is a twelve-division detector and has a DVD sensor 162 and a CD sensor 164. The DVD sensor 162 and the CD sensor 164 are separated from each other by a predetermined distance d' from the center of the DVD sensor 162 to the center of the CD sensor 164. The predetermined distance d' is calculated considering the characteristics of optical elements such as the distance d between the DVD light source 112 and the CD light source 114 and the thickness, the position, and the angle of the beam splitter 130. For example, the predetermined distance d' is proportional to the thickness of the beam splitter 130.

A DVD sensor 162 used as a first detector receives and detects the laser beam reflected by the DVD. In order to perform such an operation, the DVD sensor 162 is composed of a first central sensor 162a divided into four regions A, B, C, and D and first and second peripheral sensors 162b and 162c each divided into two regions E and F and G and H. Among the beams divided by the diffraction grating 120, the 0 order beam is incident on the first central sensor 162a, the +1 order beam is incident on the first peripheral sensor 162b, and the −1 order beam is incident on the second peripheral sensor 162c.

Hereinafter, for convenience sake, the signals detected from the respective divided regions are denoted by the same reference numerals as those of the regions from which the signals are detected.

The signals A to H detected by the DVD sensor 162 generate a first focusing error (FE) signal and first and second tracking error (TE) signals.

To be specific, the first FE signal is generated by the signals A, B, C, and D divided by and detected by the first central sensor 162a using an astigmatism method. This is because, when the optical disk 100a is a DVD, the laser beam reflected by the DVD has a predetermined astigmatism while passing through the beam splitter 130. Since the astigmatism method, a differential push-pull (DPP) method as described later, a differential phase detection (DPD) method, and a three-beam method, are well-known to those who skilled in the art, detailed description thereof is omitted.

The first and second TE signals are generated by the signals A to H detected by the DVD sensor 162 using the DPP method, the DPD method, and the three-beam method. According to an aspect of the present invention, the DVD sensor 162 generates the first TE signal by the DPP method when the optical disk 100a is a DVD-R and a DVD±RW and generates the second TE signal by the DPD method when the optical disk is a DVD-ROM.

On the other hand, the CD sensor 164 used as a second detector receives and detects the laser beam reflected by the CD to generate a second FE signal and a third TE signal. In order to perform such an operation, the CD sensor 164 is divided into four regions I, J, K, and L. That is, the second FE signal is generated using signals I, J, K, and L which are divided by and detected by the CD sensor 164 using the astigmatism method. The third TE signal is generated using signals I, J, K, and L which are divided by and detected by the CD sensor 164 using the DPD method or the three-beam method. According to an aspect of the present invention, the CD sensor 164 generates the third TE signal by the DPD method.

Since the diffraction angle caused by the diffraction grating 120 varies with the wavelength of each laser beam and the track pitch of the DVD and the track pitch of the CD are 0.74 μm and 1.6 μm, which are different from each other, it is difficult to control the phases of laser beams having different diffraction angles using the three-beam method. To solve the problem of controlling the phases of the laser beams focused on the DVD and the CD by the diffraction grating 120, the TE signals are generated by the DPD method in the case of the CD.

Methods of generating the FE signals and the TE signals will be described in detail in accordance with the types of the optical disk 100a.

Figure 3A:
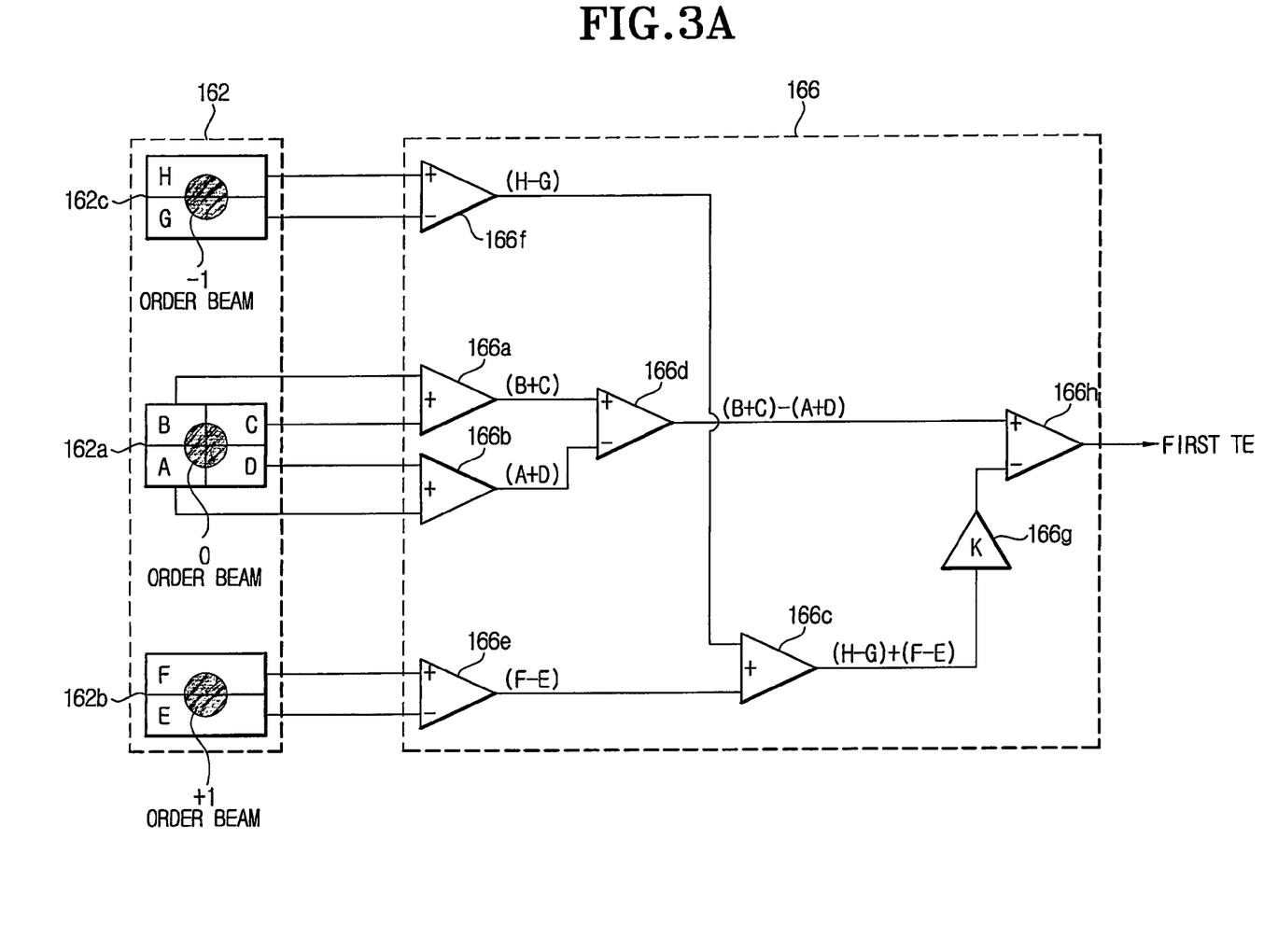
FIGS. 3A to 3C are detailed circuit diagrams of the photodetector illustrated in FIG. 2.
Figure 3B:
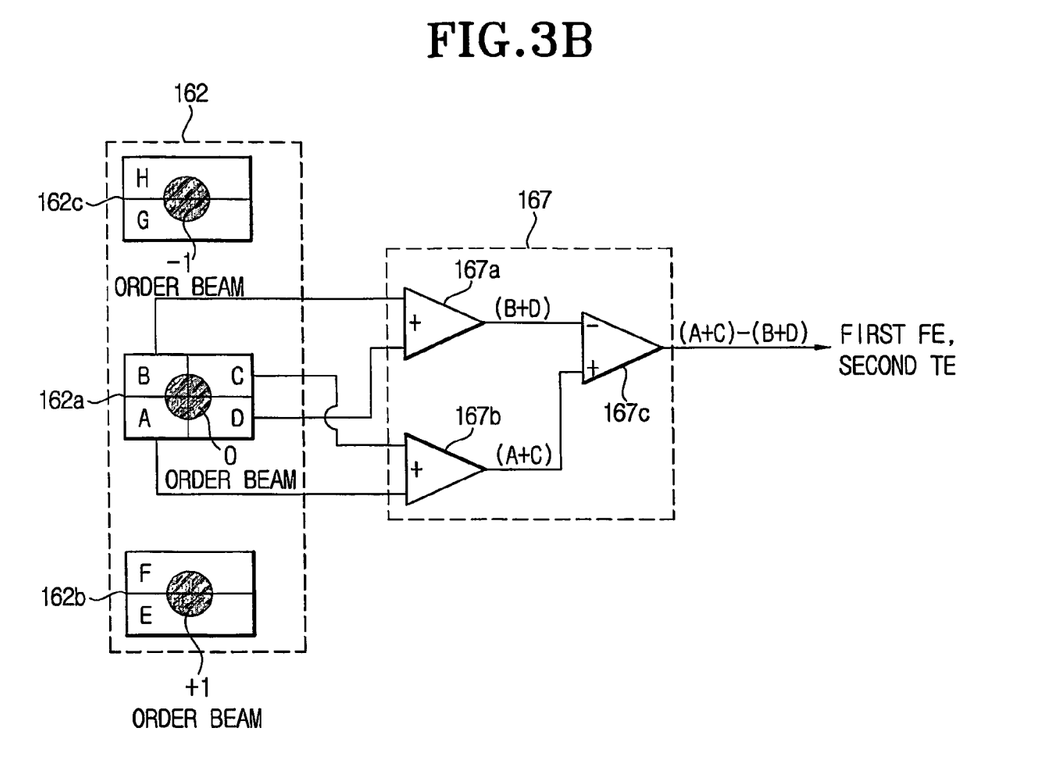
Figure 3C:
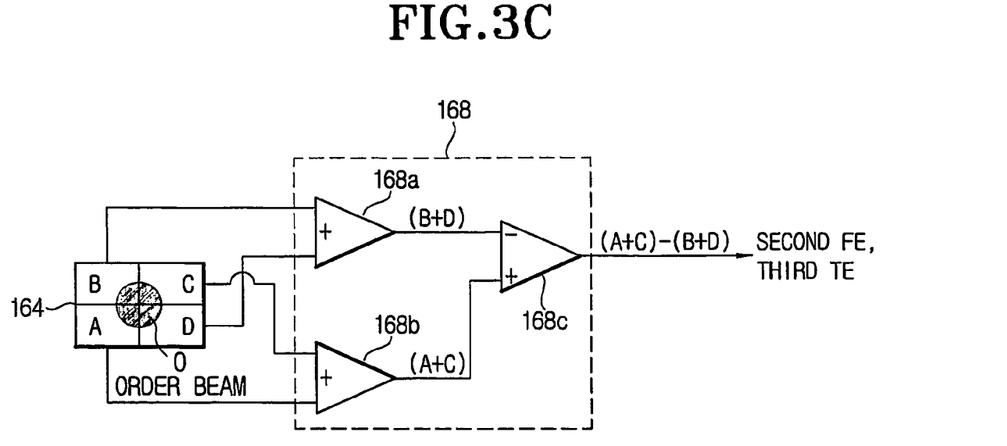

FIGS. 3A to 3C are detailed circuit diagrams of the photodetector illustrated in FIG. 2.

FIG. 3A is a circuit diagram illustrating a part of the photodetector illustrated in FIG. 2 in order to describe a method of detecting the first TE signal when the optical disk of FIG. 1 is either the DVD-R or the DVD±RW.

Referring to FIG. 3A, the photodetector 160 further includes a first calculating portion 166 for generating the first TE signal. The first calculating portion 166 generates the first TE signal by the DPP method. The generated first TE signal is used for the tracking servo of the optical pick-up 100 when the optical disk 100a is either the DVD-R or the DVD±RW.

In order to perform such an operation, the first calculating portion 166 includes a first adder 166a, a second adder 166b, a third adder 166c, a first subtracter 166d, a second subtracter 166e, a third subtracter 166f, an amplifier 166g, and a fourth subtracter 166h.

The first adder 166a adds B to C (B+C) among the respective signals A, B, C, and D of the 0 order beam. The second adder 166b adds A to D (A+D). The first subtracter 166d subtracts (A+D) from (B+C) ((B+C)-(A+D)). This is because the phase of (B+C) is different from the phase of (A+D).

The second subtracter 166e adaptively subtracts the signal E of the +1 order beam from the signal F of the +1 order beam (F−E). The third subtracter 166f adaptively subtracts the signal G of the −1 order beam from the signal H of the −1 order beam (H−G). The third adder 166c adds (F−E) to (H−G) ((H−G+(F−E)). This is because the phase of (F−E) is equal to the phase of (H−G).

The amplifier 166g amplifies the signal output from the third adder 166c by a predetermined number K (K{(H−G)+(F−E)}). Here, K is a gain value corresponding to the ratio of the amount of the 0 order beam to the amount of the ±1 order beam set in the form of a predetermined look-up table (not shown).

The fourth subtracter 166h subtracts K{(H−G)+(F−E)} from (B+C)−(A+D) to output the first TE signal {(B+C)−(A+D)}−K{(H−G)+(F−E)}. Therefore, the first TE signal of the optical disk 100a is calculated by the DPP method.

FIG. 3B is a circuit diagram illustrating a part of the photodetector illustrated in FIG. 2 in order to describe a method of detecting the first FE signal when the optical disk of FIG. 1 is either the DVD-R or the DVD±RW and a method of detecting the second TE signal when the optical disk of FIG. 1 is the DVD-ROM.

Referring to FIG. 3B, the photodetector 160 further includes a second calculating portion 167. The second calculating portion 167 generates the first FE signal of the optical disk 100a by the astigmatism method and the second TE signal of the optical disk 100a by the DPD method. Here, the generated first FE signal is used for the focusing servo of the optical pick-up 100 when the optical disk 100a is one of the DVD-R, the DVD±RW, and the DVD-ROM. The second TE signal is used for the tracking servo of the optical pick-up 100 when the optical disk 100a is the DVD-ROM.

In order to perform such an operation, the second calculating portion 167 includes a fourth adder 167a, a fifth adder 167b, and a fifth subtracter 167c. The fourth adder 167a adds B to D (B+D) among the respective signals A, B, C, and D of the 0 order beam. The fifth adder 167b adds A to C (A+C). The fifth subtracter 167c subtracts (B+D) from (A+C) ((A+C)-(B+D)). That is, the finally output (A+C)-(B+D) is used as the first FE signal and the second TE signal in accordance with the types of optical disk 100a.

FIG. 3C is a circuit diagram illustrating a part of the photodetector illustrated in FIG. 2 in order to describe methods of detecting the second FE signal and the third TE signal when the optical disk of FIG. 1 is the CD.

Referring to FIG. 3C, the photodetector 160 further includes a third calculating portion 168. The third calculating portion 168 generates the second FE signal by the astigmatism method and the third TE signal by the DPD method. The generated second FE signal and third TE signal are used for the focusing servo and the tracking servo of the optical pick-up 100 when the optical disk 100a is the CD.

In order to perform such an operation, the third calculating portion 168 includes a sixth adder 168a, a seventh adder 168b, and a sixth subtracter 168c. The sixth adder 168a adds J to L (J+L) among the signals I, J, K, and L detected by the CD sensor 164. The seventh adder 168b adds I to K (I+K). The sixth subtracter 168c subtracts (J+L) from (I+K) ((I+K)-(J+L)). The finally output (I+K)-(J+L) is the second FE signal and the third TE signal.

The methods of generating the FE signals and the TE signals in accordance with the types of optical disks 100a will be described in [TABLE 1].

TABLE 1

| Kinds of Optical Disk | Methods | Signals | TE signals Methods | Signals |
|---|---|---|---|---|
| DVD-R/±RW/RAM | Astigmatism | (A + C) − (B + D) | DPP | {(B + C) − (A + D)} − K{(H − G) + (F − E)} |
| DVD-ROM | Astigmatism | (A + C) − (B + D) | DPD | (A + C) − (B + D) |
| CD | Astigmatism | (I + K) − (J + L) | DPD | (I + K) − (J + L) |

Referring to [TABLE 1], when the two-wavelength laser LD 110 is used, the operations performed in order to record data in and to reproduce data from the optical disk 100a are calculated by the methods set in accordance with the types of optical disks 100a.

Figure 4:
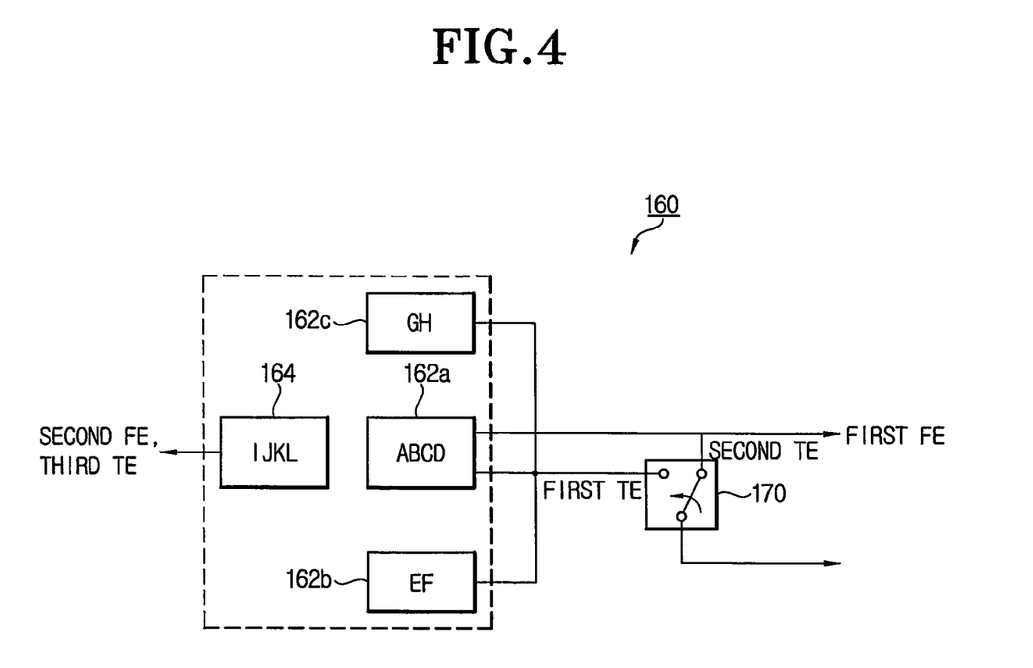
FIG. 4 is a schematic circuit diagram of the photodetector illustrated in FIGS. 3A to 3C.

On the other hand, FIG. 4 is a schematic circuit diagram of the photodetector illustrated in FIGS. 3A to 3C.

Referring to FIG. 4, the photodetector 160 further includes a switching portion 170. The switching portion 170 adaptively and selectively outputs either the first TE signal generated by the DPP method or the second TE signal generated by the DPD method in accordance with the type of optical disk 100a. For example, when the optical disk 100a is one of a DVD-R, DVD+RW, and DVD-RW, the switching portion 170 selectively outputs the first TE signal calculated by the first calculating portion 166. At this time, the first FE signal is output.

When the optical disk 100a is a DVD-ROM, the switching portion 170 selectively outputs the second TE signal calculated by the second calculating portion 167. At this time, the first FE signal is output. Here, the selection of the switching portion 170 is controlled by a controlling portion (not shown) for controlling the whole operation of the optical pick-up 100.

On the other hand, the third TE signal calculated by the third calculating portion 168 can be calculated by the three-beam method as well as by the DPD method. The three-beam method can be used by controlling the diffraction angle so that the three beams are focused on the least common multiple track of the track pitches of the DVD and the CD. This is because the track pitch of the DVD is different from the track pitch of the CD.

On the other hand, when the photodetector 160 according to an aspect of the present invention is used as the optical pick-up 100 that emits the two-wavelength laser beam, it is possible to detect the FE signals and the TE signals using a simple optical system as illustrated in FIG. 1.

As described above, it is possible to use the photodetector with the optical pick-up that emits the two-wavelength laser beam. In particular, since it is possible to reduce the number of optical elements in the photodetector according to aspects of the present invention, it is possible to miniaturize and simplify the optical pick-up and to improve the assembling of the optical pick-up. It is also possible to reduce the manufacturing cost of the optical pick-up, and to minimize the number of parts. Accordingly, it is possible to improve reliability and to thus improve productivity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A photodetector for, when light emitted from a two-wavelength light source is divided into at least three light components to be reflected by an optical recording medium, detecting the reflected light components, the photodetector comprising:
   a first detector divided into no more than eight sections detecting the at least three light components reflected by the optical recording medium to convert the light components into a first set of electrical signals;
   a first calculating portion calculating a first tracking error signal from the first set of electrical signals converted by the first detector by a differential push-pull method;
   a second calculating portion calculating a first focusing error signal by an astigmatism method and calculating a second tracking error signal by a differential phase detection method from the first set of electrical signals converted by the first detector;
   a second detector divided into four sections detecting the at least three light components reflected by the optical recording medium to convert the at least three light components into a second set of electrical signals; and
   a third calculating portion calculating a second focusing error signal by the astigmatism method and calculating a third tracking error signal by the differential phase detection method from the second set of electrical signals converted by the second detector,
   wherein the first detector includes:
      a first central sensor having a region divided vertically and horizontally into four sub regions detecting a central light component among the at least three light components reflected by the optical recording medium to convert the central light component into the first set of electrical signals;
      a first peripheral sensor having a region divided vertically or horizontally into two sub regions detecting a first peripheral light component among the at least three light components reflected by the optical recording medium to convert the first peripheral light component into the first set of electrical signals; and
      a second peripheral sensor having a region divided vertically or horizontally into two sub regions detecting a second peripheral light component among the at least three light components detected by the optical recording medium to convert the second peripheral light component into the first set of electrical signals.

2. The photodetector according to claim 1, wherein the optical recording medium is one among a DVD-R, a DVD+RW, a DVD-RW, and a CD.

3. The photodetector according to claim 2, further comprising a switching portion selectively outputting either the first tracking error signal or the second tracking error signal in accordance with a type of optical recording medium.

4. The photodetector according to claim 3,
   wherein the switching portion selectively outputs the first tracking error signal calculated by the first calculating portion when the optical recording medium is one among the DVD-R, the DVD+RW, and the DVD-RW, and
   wherein the switching portion selectively outputs the second tracking error signal calculated by the second calculating portion when the optical recording medium is the DVD ROM.

5. The photodetector according to claim 2, wherein the third calculating portion calculates the second focusing error signal and the third tracking error signal when the optical recording medium is the CD.

6. The photodetector according to claim 1, wherein the first detector is a DVD sensor and the second detector is a CD sensor.

7. The photodetector according to claim 6, wherein the DVD sensor includes a first central sensor and first and second peripheral sensors.

8. The photodetector according to claim 7, wherein the first central sensor is divided into four regions and the first and second peripheral sensors are each divided into two regions.

9. The photodetector according to claim 8, wherein a 0 order beam is incident on the first central sensor, a +1 order beam is incident on the first peripheral sensor and a −1 order beam is incident on the second peripheral sensor.

10. The photodetector according to claim 6, wherein the DVD sensor generates the first tracking error signal using the differential push-pull method when the optical recording medium is a DVD-R or a DVD±RW and the DVD sensor generates the second tracking error signal using the differential phase detection method when the optical recording medium is a DVD-ROM.

11. The photodetector according to claim 10, wherein the first tracking error signal is used for tracking a servo of an optical pick-up when the recording medium is a DVD-R or a DVD±RW.

12. A photodetector detecting reflected light components from an optical recording medium, the photodetector comprising:
   a first detector divided into no more than eight sections detecting the reflected light components from the optical recording medium and converting the reflected light components into a first set of electrical signals;

a first calculating portion calculating a first tracking error signal from the first set of electrical signals converted by the first detector using a differential push-pull method;

a second calculating portion calculating a first focusing error signal and a second tracking error signal from the first set of electrical signals converted by the first detector using an astigmatism method and a differential phase detection method, respectively;

a second detector detecting the reflected light components from the optical recording medium and converting the reflected light components into a second set of electrical signals; and a third calculating portion calculating a second focusing error signal and a third tracking error signal from the second set of electrical signals converted by the second detector using the astigmatism method and the differential phase detection method, respectively, wherein the first detector includes:

a first central sensor having a region divided vertically and horizontally into four sub regions detecting a central light component among the at least three light components reflected by the optical recording medium to convert the central light component into the first set of electrical signals;

a first peripheral sensor having a region divided vertically or horizontally into two sub regions detecting a first peripheral light component among the at least three light components reflected by the optical recording medium to convert the first peripheral light component into the first set of electrical signals; and a second peripheral sensor having a region divided vertically or horizontally into two sub regions detecting a second peripheral light component among the at least three light components detected by the optical recording medium to convert the second peripheral light component into the first set of electrical signals.

13. The photodetector according to claim 12, wherein the first detector is divided into eight detecting regions and the second detector is divided into four detecting regions.

14. The photodetector according to claim 12, wherein the first detector is a DVD sensor and the second detector is a CD sensor.

15. The photodetector according to claim 14, wherein the DVD sensor includes a first central sensor and first and second peripheral sensors.

16. The photodetector according to claim 15, wherein the first central sensor is divided into four regions and the first and second peripheral sensors are each divided into two regions.

* * * * *